US010900865B2

(12) United States Patent
Xu et al.

(10) Patent No.: US 10,900,865 B2
(45) Date of Patent: Jan. 26, 2021

(54) EXPERIMENTAL SETUP FOR THREE-DEGREE-OF-FREEDOM LARGE-AMPLITUDE FREE VIBRATION IN WIND TUNNEL TEST

(71) Applicant: Dalian University of Technology, Dalian (CN)

(72) Inventors: Fuyou Xu, Dalian (CN); Jing Yang, Dalian (CN)

(73) Assignee: Dalian University of Technology, Liaoning (CN)

(*) Notice: Subject to any disclaimer, the term of this patent is extended or adjusted under 35 U.S.C. 154(b) by 143 days.

(21) Appl. No.: 16/349,603

(22) PCT Filed: Mar. 6, 2018

(86) PCT No.: PCT/CN2018/078117
§ 371 (c)(1),
(2) Date: May 13, 2019

(87) PCT Pub. No.: WO2019/169545
PCT Pub. Date: Sep. 12, 2019

(65) Prior Publication Data
US 2020/0072699 A1 Mar. 5, 2020

(51) Int. Cl.
*G01M 9/04* (2006.01)
*G01M 7/02* (2006.01)
(Continued)

(52) U.S. Cl.
CPC ............. *G01M 9/04* (2013.01); *G01M 7/02* (2013.01); *G01M 7/06* (2013.01); *G01M 5/0008* (2013.01); *G01M 9/062* (2013.01)

(58) Field of Classification Search
CPC .......... G01M 9/02; G01M 9/04; G01M 9/062; G01M 9/06; G01M 9/08; G01M 7/00;
(Continued)

(56) References Cited

U.S. PATENT DOCUMENTS 4,116,056 A * 9/1978 Bulychev ................ G01M 9/04
73/147

FOREIGN PATENT DOCUMENTS

CN 202793734 U * 3/2013
CN 104089753 A * 10/2014
(Continued)

OTHER PUBLICATIONS

Gouder et al, Experimental Aerodynamic Control of a Long-Span Suspension Bridge Section Using Leading- and Trailing-Edge Control Surfaces, IEEE Transactions on Control Systems Technology, vol. 24, No. 4, Jul. 2016 (Year: 2016).*
(Continued)

*Primary Examiner* — David L Singer
(74) *Attorney, Agent, or Firm* — Muncy, Geissler, Olds & Lowe, PC

(57) ABSTRACT

An experimental setup for three-degree-of-freedom large-amplitude free vibration in a wind tunnel test. The setup includes a rigid test model, rigid circular rods, rigid lifting arms, arc blocks with grooves, lightweight high-strength thin strings, linear tensile springs, fixed pulleys, and bearings. Large-amplitude three-degree-of-freedom free vibrations of test models can be adapted by the vertical deformation of the springs without any tilt. The possible nonlinear mechanical stiffness due to vertical spring tilt and lateral spring deflection are excluded. It is convenient to install the test model and adjust the initial angle of attack in the new experimental setup. The linear stiffness property and hence constant vibration frequency can be ensured for very large-amplitude vibrations due to the eliminations of spring deflection and tilt.

8 Claims, 1 Drawing Sheet

(51) Int. Cl.
*G01M 7/06* (2006.01)
*G01M 9/06* (2006.01)
*G01M 5/00* (2006.01)

(58) Field of Classification Search
CPC ........ G01M 7/02; G01M 7/06; G01M 5/0066; G01M 5/0008
USPC .......................................................... 73/147
See application file for complete search history.

(56) References Cited

FOREIGN PATENT DOCUMENTS

| | | | | |
|---|---|---|---|---|
| CN | 104792490 | A | * | 7/2015 |
| CN | 107345846 | A | | 11/2017 |
| CN | 107588923 | A | | 1/2018 |
| CN | 108225715 | A | | 6/2018 |
| JP | 60164233 | A | * | 7/1985 ............. G01M 9/06 |
| JP | H09210839 | A | | 8/1997 |
| JP | 2001041846 | A | * | 2/2001 |
| SU | 614669 | A1 | | 3/1981 |

OTHER PUBLICATIONS

Zhao et al, Experimental flutter and buffet suppression of a sectional suspended-bridge, 53rd IEEE Conference on Decision and Control Dec. 15-17, 2014. Los Angeles, California, USA (Year: 2014).*
Boberg et al, A Novel Bridge Section Model Endowed with Actively Controlled Flap Arrays Mitigating Wind Impact, 2015 IEEE International Conference on Robotics and Automation (ICRA) Washington State Convention Center Seattle, Washington, May 26-30, 2015 (Year: 2015).*
Translation of Written Opinion of the International Searching Authority for PCT/CN2018078117 dated Dec. 5, 2018 (Year: 2018).*
Machine translation of CN104089753 (Year: 2020).*
Machine translation of CN104792490 (Year: 2020).*
Machine translation of CN202793734 (Year: 2020).*
Machine translation of JP2001041846 (Year: 2020).*

* cited by examiner

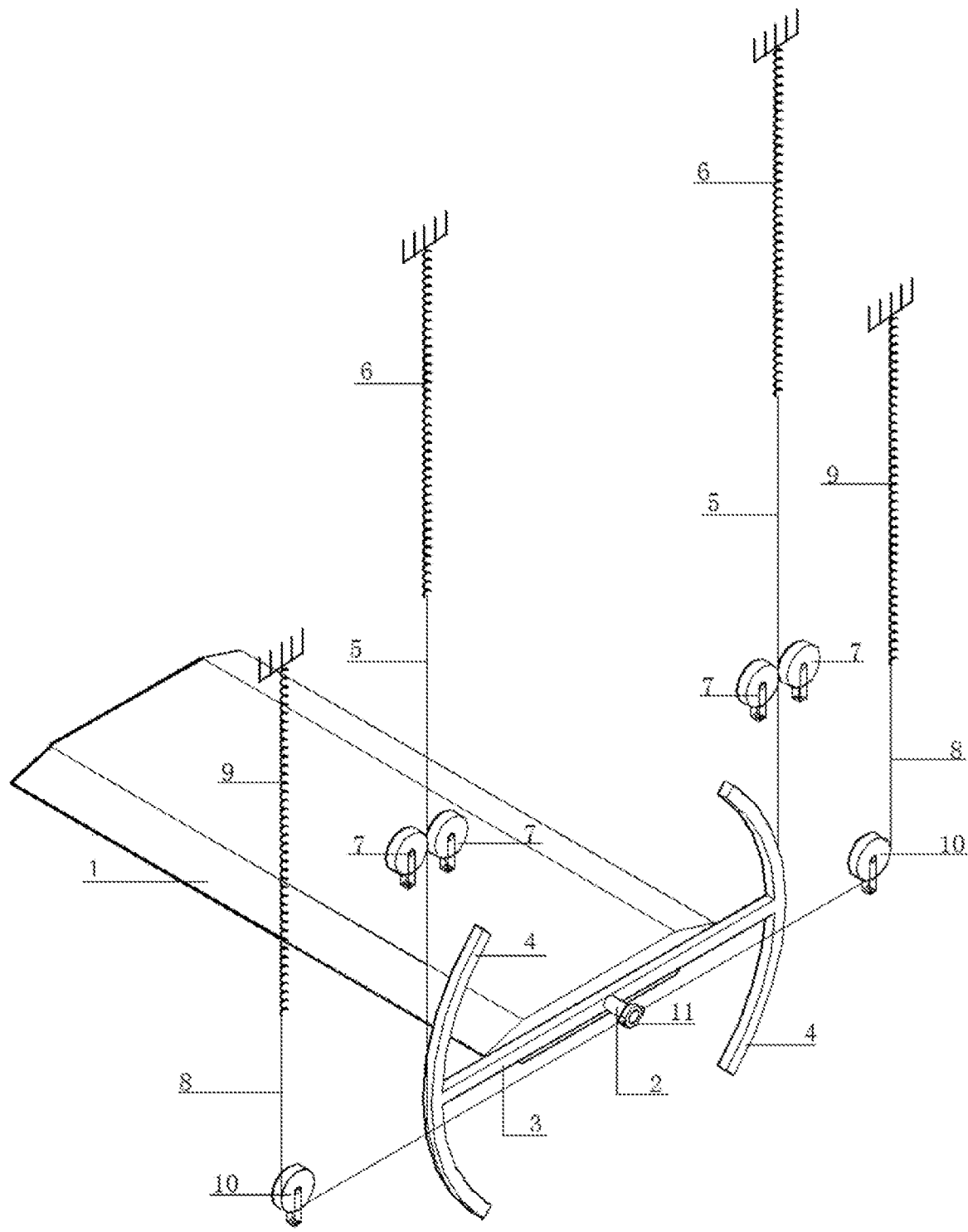

EXPERIMENTAL SETUP FOR THREE-DEGREE-OF-FREEDOM LARGE-AMPLITUDE FREE VIBRATION IN WIND TUNNEL TEST

TECHNICAL FIELD

The invention is an experimental setup for three-degree-of-freedom large-amplitude free vibrations of bridge deck rigid models in wind tunnel test with linear stiffness in vertical, torsional, and lateral modes. The large-amplitude vertical-torsional coupled vibration system includes rigid circular lifting arms, light-weight and high-strength strings, linear vertical tensile springs, and fixed pulleys. The large-amplitude lateral system includes light-weight and high-strength strings, bearings, linear vertical tensile springs, and fixed pulleys. The three-degree-of-freedom (vertical, torsional, and lateral) large-amplitude vibrations of a model are adapted by the free deformations of the vertical tensile springs. The vertical, lateral, and torsional stiffness of the system can be simulated by combining the linear tensile stiffness of the springs, the rigid arc lifting arms, and the fixed pulleys. During the large-amplitude coupled vibrations, the system mass and inertia of moment, the stiffness of springs, and length of the force arm are unchanged, and hence the three modes vibration frequencies remain constants.

TECHNICAL BACKGROUND

In wind tunnel tests, the three-degree-of-freedom coupled free vibration is one major method for deck vibration (vortex, buffeting, galloping, flutter) measurement and identification of flutter derivatives. For the traditional three-degree-of-freedom coupled free vibration testing device, the deck sectional model is suspended by vertical and lateral springs, and the apparatus is very simple and convenient. For the small-amplitude three-degree-of-freedom coupled vibrations, the vertical springs tilt a little, the lateral springs vibration in vertical direction is small, and the vertical and lateral springs stiffness is approximately linear. However, the traditional setup has some drawbacks: (1) The deflections of the lateral springs due to its self-weight deteriorate the linear mechanical stiffness property in the lateral mode; (2) The vertical motions of the lateral springs induced by the vertical and torsional vibration of the model increase the mechanical damping of the system; (3) The effects of the lateral springs on the modal mass are not yet clear for a model with vertical-torsional vibration; (4) The vertical springs significantly tilt during the lateral-torsional vibration, which increase the mechanical damping of the system; (5) The effects of the vertical springs on modal mass are not yet clear for a model with lateral-torsional vibration; (6) When the torsional amplitude is relatively larger, the vertical springs will obviously tilt, which significantly deteriorate the linear mechanical stiffness of the springs, and the vertical and torsional stiffness of the coupled system cannot remain constants. They are related to amplitude, and unacceptable errors may be induced. The problem tends to be more serious for larger amplitudes. As a result, the traditional setup is not applicable for large-amplitude vibration tests.

It is generally considered that the error can be ignored when the torsional amplitude is lower than 2°. For large-amplitude torsional vibrations, e.g., when the old Tacoma Narrows Bridge was destroyed by wind loads, the torsional amplitude reaches amazing 35°. These wind-induced vibrations cannot be experimentally investigated by using the traditional testing device.

SUMMARY

The invention can solve the following technical problem: In order to satisfy with the requirement of three-degree-of-freedom large-amplitude free vibration of sectional models of bridge deck and other structural members in wind tunnel test, a novel testing setup is proposed to effectively avoid various nonlinear factors involved in the traditional device and ensure large-amplitude coupled linear free vibration. The new setup includes rigid deck model, rigid circular rods, rigid lifting arms, arc blocks with grooves, lightweight high-strength thin strings, fixed pulleys, and linear tensile springs.

The technical scheme of the invention:

An experimental setup for large-amplitude three-degree-of-freedom free vibration wind tunnel test, includes the rigid test model 1, the rigid circular rods 2, the rigid lifting arms 3, the arc blocks with grooves 4, the first lightweight high-strength thin strings 5, the first linear tensile springs 6, the first fixed pulley 7, the second thin strings 8, the second linear tensile springs 9, the second fixed pulley 10, and the bearings 11. The rigid test model 1 is connected with rigid circular rods 2 at each end. The rigid circular rods 2 are perpendicularly passed through the center of the rigid lifting arms 3 to ensure that the torsional center of the rigid test model 1 is on the same line with those of the rigid circular rods 2 and the rigid lifting arms 3; The arc blocks with grooves 4 are fixed at the both ends of rigid lifting arms 3, and the center of arc blocks 4 is coincide with that of the rigid lifting arms 3; The first lightweight high-strength thin string 5 wraps around the arc block 4, the upper end of the first lightweight high-strength thin string 5 is connected with the lower end of the vertical spring 6, and the lower end of the first lightweight high-strength thin string 5 is fixed at the bottom of the arc blocks 4; During the large-amplitude three-degree-of-freedom free vibration process, the arc blocks 4 rotate along the first lightweight high-strength thin strings 5, and the security of the setup can be ensured. The first lightweight high-strength thin strings 5 are vertically passed through the first fixed pulleys 7 to prevent any lateral tilt of the springs 6 during the lateral vibration of the rigid test model 1; The top ends of the second thin strings 8 is connected with bottom of the second linear springs 9; The second thin strings 8 curved around the second fixed pulleys 10, and their lower ends are connected with the bearing 11 that supported on the rigid circular rods 2; The bearing 11 can freely rotate around the rigid circular rods 2, and the friction should be as small as possible. During the lateral vibration of the rigid test model 1, the second linear tensile springs 9 only vertically deform, and hence the linear lateral stiffness requirement can be satisfied.

The length of rigid lifting arms 3 and the diameter of arc blocks 4 are determined according to several parameters including the mass, the inertia of moment, and the frequency ratio between torsional and vertical modes. Generally, they are within 0.2~1.5 m.

The friction coefficients between the first fixed pulleys 7 and the first lightweight high-strength thin strings 5, and between the second fixed pulleys 10 and the second thin strings 8 should be as small as possible. During the three-degree-of-freedom free vibrations, the damping ratio of the system should be as small as possible. In order to restrain the lateral motion of the first lightweight high-strength thin strings 5, the distance between the first two fixed pulleys 7 should be as small as possible under the condition that the rotation of first fixed pulleys 7 cannot be affected. In other words, the lateral motion space of the first lightweight high-strength thin strings 5 should be very small to ensure the vertical state of the first lightweight high-strength thin strings 5 and the first linear tensile springs 6. Thus, the first linear tensile springs 6 only generate vertical deformation. The second thin strings 8 should be kept in a tensioning state to ensure the second linear tensile springs 9 always keep linear elastic state.

The vertical distance between the first fixed pulleys 7 and the rigid lifting arms 3, and the horizontal distance between the second fixed pulleys 10 and the bearings 11 should be sufficiently long. Then, the effect of the vertical motion on the lateral stiffness, and the effect of the lateral motion on the vertical stiffness can be reduced.

The advantages of the invention are listed as follows. The three-degree-of-freedom large-amplitude vibrations of the test model is adapted by the vertical deformations of the tensile springs. During the vibrations, the vertical springs have no lateral tilt, and the uncertainty effect of lateral springs are excluded, and the linear geometrical stiffness requirements can be satisfied. In addition, the stiffness of the tensile springs, system mass and inertia of moment, and the force arm length are unchanged during the test, and hence the three vibration frequencies remain constants. The geometrical nonlinearity due to vertical springs tilt and the adverse effect due to self-weight of the lateral springs involved in the traditional setup can be successfully avoided. Comparing with the traditional setup, the proposed one has the following advantages: (1) The lateral springs are removed, and the linear stiffness property is adapted by the vertical springs, the light weight high-strength strings, and the fixed pulleys; (2) The lateral tilt of the vertical springs in the traditional setup can be circumvented by using the vertical springs, sufficiently long light-weight high-strength thin strings, and fixed pulleys; (3) Due to the introduction of sufficiently long thin strings, the effects of the vertical and torsional displacements on the lateral stiffness can be omitted, the lateral displacement on the vertical and torsional stiffness can also be omitted, and thus the nonlinearities due to large-amplitude vibrations can be alleviated; (4) The linear stiffness of vertical and torsional modes can be ensured for very large-amplitude vibrations due to the adoption of the rigid lifting arms and arc blocks; (5) Benefiting from the reliable lateral constraint and stiffness simulation, the tensile springs at the lower side of the model in the traditional setup can be removed. Consequently, the restrictions for selecting the upper vertical springs tend to be less, and it is more convenient to make a choice.

DESCRIPTION OF THE DRAWINGS

The sole FIGURE is a structural diagram of proposed experimental setup for three-degree-of freedom large-amplitude free vibration device for deck rigid model in wind tunnel test.

Rigid test model; 2 rigid circular rod; 3 rigid lifting arm; 4 arc blocks with grooves; 5 the first lightweight high-strength thin string; 6 the first linear tensile spring; 7 the first fixed pulley; 8 the second thin string; 9 the second linear tensile spring; 10 the second fixed pulley; 11 the bearings.

DETAILED DESCRIPTION

Combining the technical scheme and attached drawing, the specific implementations of this invention are shown as follows:

As shown in the sole FIGURE, the new experimental setup for large-amplitude three-degree-of-freedom free vibration wind tunnel test is composed of the rigid test model 1, the rigid circular rods 2, the rigid lifting arms 3, the arc blocks with grooves 4, the first lightweight high-strength thin strings 5, the first linear tensile springs 6, the first fixed pulley 7, the second thin strings 8, the second linear tensile springs 9, the second fixed pulley 10, and the bearings 11. The rigid test model 1 is connected with rigid rods 2 at each end. The rigid rods 2 are perpendicularly passed through the center of the rigid lifting arms 3 to ensure that the torsional center of the rigid test model 1 is on the same line with those of the rigid rods 2 and the rigid lifting arms 3; The arc blocks with grooves 4 are fixed at the both ends of rigid lifting arms 3, and the center of arc blocks 4 is coincide with that of the rigid lifting arms 3; The first lightweight high-strength thin string 5 wraps around the arc block 4, the upper end of the first lightweight high-strength thin string 5 is connected with the lower end of the vertical spring 6, and the lower end of the first lightweight high-strength thin string 5 is fixed at the bottom of the arc blocks 4; During the large-amplitude three-degree-of-freedom free vibration process, the arc blocks 4 rotate along the first lightweight high-strength thin strings 5, and the security of the setup can be ensured. The first lightweight high-strength thin strings 5 are vertically passed through the first fixed pulleys 7 to prevent any lateral tilt of the springs 6 during the lateral vibration of the rigid test model 1; The top ends of the second thin strings 8 is connected with bottom of the second linear springs 9; The second thin strings 8 curved around the second fixed pulleys 10, and their lower ends are connected with the bearing 11 that supported on the rigid rods 2; The bearing 11 can freely rotate around the rigid rods 2, and the friction should be as small as possible. During the lateral vibration of the rigid test model 1, the second linear tensile springs 9 only vertically deform, and hence the linear lateral stiffness requirement can be satisfied.

The invention claimed is:

1. An experimental setup for three-degree-of-freedom large-amplitude free vibration in wind tunnel testing, wherein the setup includes;
   a rigid test model, rigid circular rods, rigid lifting arms, arc blocks with grooves, first lightweight high-strength thin strings, first linear tensile springs, first fixed pulleys, second thin strings, second linear tensile springs, second fixed pulleys, and bearings;
   the rigid test model is connected with rigid circular rods at each end;
   the rigid circular rods are perpendicularly passed through the center of each of the rigid lifting arms to ensure that the torsional center of the rigid test model is on the same line with those of the rigid circular rods and the rigid lifting arms;
   each of the arc blocks with grooves is fixed at both ends of each of the rigid lifting arms, and the center of each of the arc blocks coincides with that of the rigid lifting arms;
   the first lightweight high-strength thin strings each wrap around the arc blocks, the upper end of each of the first lightweight high-strength thin strings is connected with the lower end of each of the first linear tensile springs, and the lower end of each of the first lightweight high-strength thin strings is fixed at the bottom of the arc blocks;
   the first lightweight high-strength thin strings are vertically passed through the first fixed pulleys to prevent any lateral tilt of the first lightweight high-strength springs during the lateral vibration of the rigid test model;

the top end of each of the second thin strings is connected with the bottom of the second linear tensile springs;

the second thin strings curve around the second fixed pulleys, and the lower end of each of the second thin strings is connected with the bearings that are supported on the rigid circular rods;

the bearings can freely rotate around the rigid circular rods;

wherein during the large-amplitude three-degree-of-freedom free vibration process, the arc blocks rotate along the first lightweight high-strength thin strings; and during the lateral vibration of the rigid test model, the second linear tensile springs only vertically deform.

2. The experimental setup for three-degree-of-freedom large-amplitude free vibration in wind tunnel testing according to claim 1, wherein the length of each of the rigid lifting arms and the diameter of each of the arc blocks are determined according to several parameters including the rigid test model mass, inertia of moment, and the frequency ratio between torsional and vertical mode.

3. The experimental setup for three-degree-of-freedom large-amplitude free vibration in wind tunnel testing according to claim 1, wherein:

the friction coefficients between the first fixed pulleys and the first lightweight high-strength thin strings, and between the second fixed pulleys and the second thin strings are small;

during the three-degree-of-freedom free vibrations, the damping ratio of the system is small: and in order to restrain the lateral motion of the first lightweight high-strength thin strings, the distance between the first two fixed pulleys is configured so that the rotation of the first fixed pulleys is unaffected and the first linear tensile springs only generate vertical deformation.

4. The experimental setup for three-degree-of-freedom large-amplitude free vibration in wind tunnel testing according to claim 1, wherein the second thin strings are kept in a tensioning state to ensure that the second linear tensile springs are always kept in a linear elastic state.

5. The experimental setup for three-degree-of-freedom large-amplitude free vibration in wind tunnel testing according to claim 3, wherein the second thin strings are kept in a tensioning state to ensure that the second linear tensile springs are always kept in a linear elastic state.

6. The experimental setup for three-degree-of-freedom large-amplitude free vibration in wind tunnel testing according to claim 1, wherein the vertical distance between the first fixed pulleys and the rigid lifting arms, and the horizontal distance between the second fixed pulleys and the bearings are sufficiently long so that the effect of the vertical motion on the lateral stiffness, and the effect of the lateral motion on the vertical stiffness is reduced.

7. The experimental setup for three-degree-of-freedom large-amplitude free vibration in wind tunnel testing according to claim 3, wherein the vertical distance between the first fixed pulleys and the rigid lifting arms, and the horizontal distance between the second fixed pulleys and the bearings are sufficiently long so that the effect of the vertical motion on the lateral stiffness, and the effect of the lateral motion on the vertical stiffness is reduced.

8. The experimental setup for three-degree-of-freedom large-amplitude free vibration in wind tunnel testing according to claim 4, wherein the vertical distance between the first fixed pulleys and the rigid lifting arms, and the horizontal distance between the second fixed pulleys and the bearings are sufficiently long so that the effect of the vertical motion on the lateral stiffness, and the effect of the lateral motion on the vertical stiffness is reduced.

\* \* \* \* \*